United States Patent
Hu

(10) Patent No.: US 8,795,043 B2
(45) Date of Patent: Aug. 5, 2014

(54) GAME SHOW WITH SPECIAL VOTE COUNTING METHOD

(75) Inventor: William Hu, New York, NY (US)

(73) Assignee: CEM International Limited, Tong Nam Ah Comercial Centro, Macau ( * ) Notice: Subject to any disclaimer, the term of this patent is extended or adjusted under 35 U.S.C. 154(b) by 49 days.

(21) Appl. No.: 13/545,080

(22) Filed: Jul. 10, 2012

(65) Prior Publication Data

US 2014/0017654 A1 Jan. 16, 2014

(51) Int. Cl.
*A63F 9/24* (2006.01)

(52) U.S. Cl.
USPC .................................... 463/1; 463/9

(58) Field of Classification Search
USPC ........................................ 463/9, 42
See application file for complete search history.

(56) References Cited

U.S. PATENT DOCUMENTS

| | | | |
|---|---|---|---|
| 5,035,422 A * | 7/1991 | Berman | 463/18 |
| 5,108,115 A * | 4/1992 | Berman et al. | 463/9 |
| 2002/0103696 A1 | 8/2002 | Huang et al. | |
| 2003/0003990 A1 * | 1/2003 | Von Kohorn | 463/25 |
| 2003/0060264 A1 | 3/2003 | Chilton et al. | |
| 2006/0246990 A1 | 11/2006 | Downes | |
| 2007/0112648 A1 | 5/2007 | Martin | |
| 2007/0155411 A1 | 7/2007 | Morrison | |
| 2007/0174244 A1 | 7/2007 | Jones | |
| 2009/0029773 A1 | 1/2009 | Cherry | |
| 2011/0300916 A1 * | 12/2011 | Patchen | 463/1 |
| 2013/0053115 A1 * | 2/2013 | Hu | 463/9 |

* cited by examiner

*Primary Examiner* — William Brewster
*Assistant Examiner* — Jason Skaarup
(74) *Attorney, Agent, or Firm* — Dickstein Shapiro LLP

(57) ABSTRACT

A method of providing a game show that includes broadcasting performances from a plurality of contestants to audience members and receiving votes from the audience members during a voting period. The contestants who receive the most and the least votes are selected as winners. In addition, a winner from the audience members is determined by the timing of a winning vote based on a percentage of the total number of votes cast for the contestant receiving the least number of votes.

13 Claims, 2 Drawing Sheets

GAME SHOW WITH SPECIAL VOTE COUNTING METHOD

FIELD OF INVENTION

The present invention relates to a system and method for a game show that tabulates votes from audience members for contestants in a competition and awards prizes to: (1) the contestant who received the most votes, (2) the contestant who received the least votes and (3) the audience member who submitted a vote for the contestant who received the lowest number of audience votes.

BACKGROUND OF INVENTION

Game shows today follow a format where audience members vote for their favorite contestants and the contestant with the fewest number of votes is eliminated from the competition in succeeding rounds of play until only a single winner remains. The contestant with the most votes ultimately wins and the only reward that the audience members receive is the satisfaction of helping a favorite win the game show.

Although audience members may feel emotionally invested in a contestant and vote to keep that contestant on the game show, the audience members are not rewarded for their participation in the voting process of the game show. Also, the voting process is somewhat straightforward and requires no strategy: the audience member votes for the contestant he or she wants as the winner. If the majority of other audience members vote for the same contestant, that contestant wins.

On other types of game shows, the contestants themselves vote to eliminate a least favorite contestant. This is a departure from the model of voting for a winner. However, on this type of game show, the viewing audience also has no control over the result and no stake in the outcome.

Another common factor in many game shows, particularly those that showcase the talents of the contestants, including but not limited to, singing and dancing, is that the ultimate winner is often unsurprising. Although recognition of talent is subjective, there are generally contestants who are objectively more talented than other contestants. These objectively talented contestants progress through the competition until one is named the winner. The conclusion of a game show is less exciting when the winner is easy to predict. When a contestant dominates a competition, the audience members may lose interest in the results and stop voting, and/or stop watching. If voting costs money, that money is lost. Lower audience participation will affect advertising, which will also affect revenue.

To maximize the viewership of a game show, the need exists for a game show that gives the audience members a greater stake in the results.

SUMMARY OF INVENTION

The present invention is a game show where both audience members and contestants are eligible to receive prizes. Contestants receive prizes based on receiving and/or failing to receive votes from audience members. Audience members are eligible to receive a prize by casting a vote for the contestant who received the fewest votes.

The present invention provides a unique game show that allows audience members to vote for contestants and qualify to win a prize based on a vote for the contestant with the least number of votes. While the audience members are competing for prizes, the contestant who receives the most votes and/or the contestant who receives the least votes also receive a prize and advances to the next round, if such next round exists and where he or she has the opportunity to win another prize.

The contestant performances may be live, or may be pre-recorded. The audience members may view these performances in person, via television, Internet, mobile phone or through any other broadcast media. For ease, each contestant may be assigned an identifier, for example, a number or a letter, that the audience can then use in voting. Alternatively, when the performances are pre-recorded video clips, a voting button can be provided with the video clip.

In this embodiment, each audience member may cast a vote for a contestant, for multiple contestants, or multiple votes for a single contestant during a predetermined voting period. Voting can be accomplished by any telephonic or electronic voting means including but not limited to by telephone, various hand-held mobile devices, Internet, or text message. Each audience member can preferably vote as many times as he or she desires. Optionally, the audience members may be charged a fee for each vote they submit.

The audience members' votes are collected and tabulated. The contestant with the highest number of votes may advance to the next round of competition. Additionally, the contestant with the lowest number of votes may also advance to the next round of competition. These contestants may also receive a prize. In the next round, if such exists, these contestants will perform again, but will be preferably competing against a new pool of contestants, or against the contestants remaining from the previous round, or a combination thereof. The audience will again be able to vote for the contestants in the new round.

In addition to the contestants with the most and least votes being winners, an audience member who submitted a vote for the contestant with the least amount of votes is also a winner and is awarded a prize. The winner from the audience members is determined by the timing of the winning vote based on a percentage of the total number of votes cast for the contestant receiving the least number of votes.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE INVENTION

Figure 1:
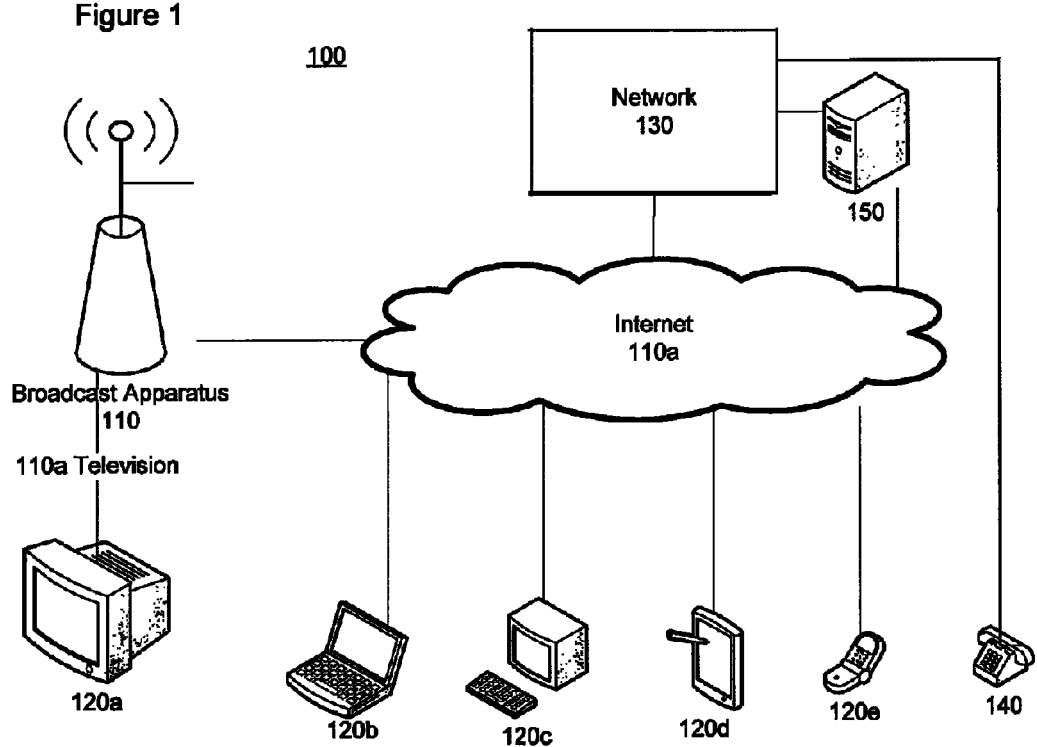
FIG. 1 depicts a technical architecture used to practice an embodiment of the present invention.

FIG. 1 is the technical architecture 100 of an embodiment of a system used to practice the method of the invention. FIG. 1 includes a broadcasting apparatus 110 that broadcasts the performances of game show contestants over various media sources including, but not limited to, television 110a and Internet 110b. The performances may be broadcast live or from a recording. Audience members view the performances using user terminals 120a-e including, but not limited to, televisions, data terminals, workstations, portable computers, and/or smart phones, which are connected to the television 110a and/or Internet 110b networks.

After the audience members view the performances, they may vote for the contestants over a telecommunications network 130 using user terminals 120a-e and/or a telephone 140. The votes that are received are pooled and tabulated by server 150.

In one embodiment, a fee may be associated with various methods of voting. For example, votes by phone can be made to toll numbers. Votes on smart phones via text message may also carry a fee per vote. Audience members who vote via a Web Browser, may be required to input their credit and/or debit card numbers before casting votes. Audience members may also be required to purchase and download specialized software to their user terminals before being able to place votes.

In another embodiment, placing votes is free for audience members, but audience members are required to watch advertisements before or while they place votes. For example, phone audience members may be required to listen to an advertisement before placing a vote, while audience members using a Web Browser may see an advertisement displayed in their Web Browsers while or before viewing the options to place a vote.

Figure 2:
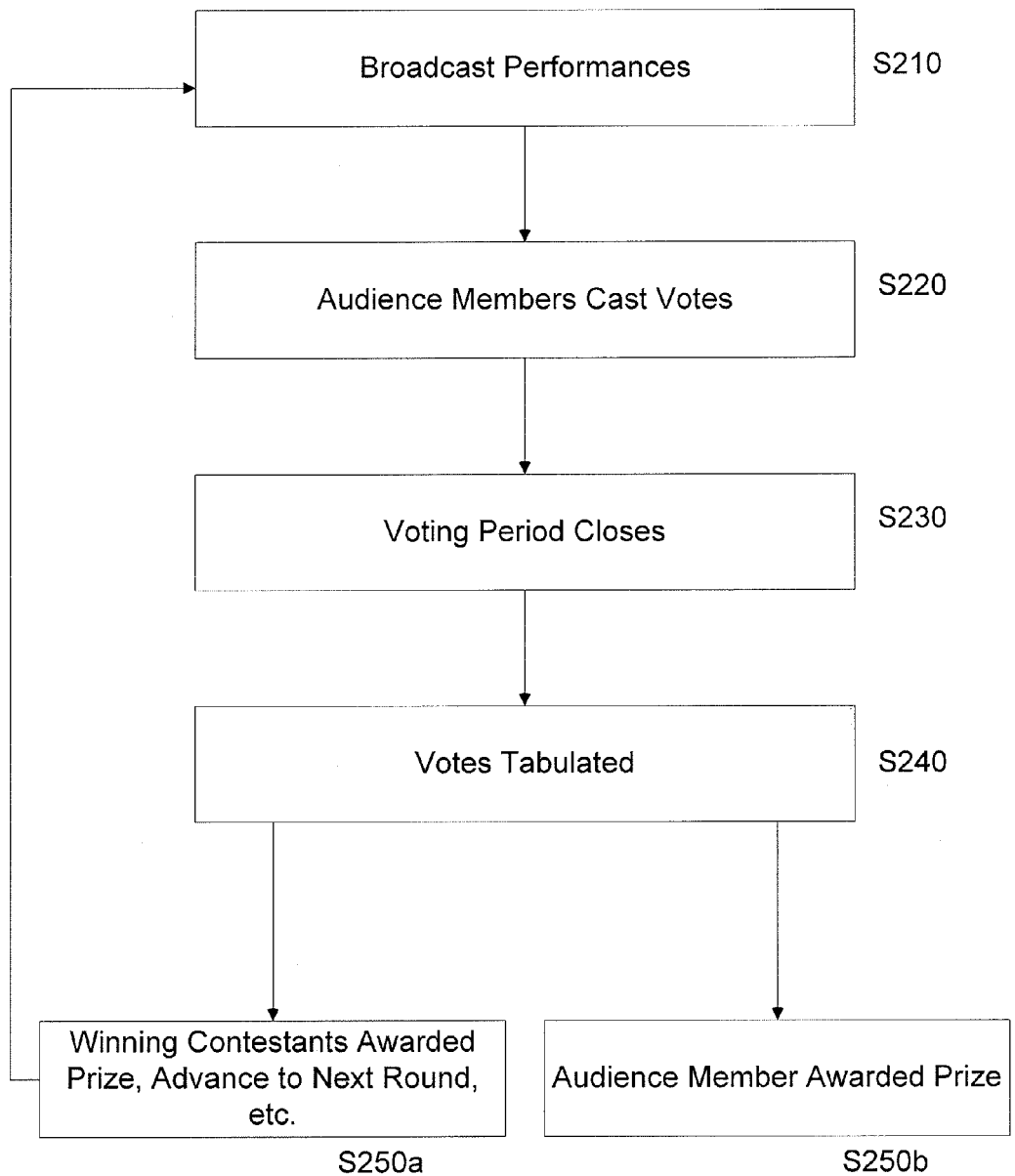
FIG. 2 depicts a workflow diagram of an embodiment of the present invention.

Referring to FIG. 2, the first step of the workflow 200 of the game show is broadcasting the performances of the contestants to an audience (S210). Audience members may observe the performances live in the studio as well as remotely via television and/or the Internet. The performances may be broadcast live, taped and then broadcast at a scheduled time, or accessed by the audience members from recordings such as posted video clips.

The types of performances by the contestants may vary depending on the desired audience for the program, the time slot, or any other factors that would impact the viewership and popularity of the show. Performances may include, but are not limited to, exhibitions of talents in the dramatic arts, such as singing, dancing, stand up comedy and/or reciting monologues. Talents may also include, but are not limited to, odd demonstrations such as feats of strength, contortions, imitations, animal wrangling, juggling, pantomime, ventriloquy and/or animal calls.

For ease of identification, rather than listing the contestants by name, the contestants may be assigned contestant numbers. These contestant numbers may be used later to easily identify the contestants during the voting process. For example, if the contestants are assigned numbers, voting by methods that limit character entry, such as text message, will be easier for audience members to use.

Once the performances of the contestants have been broadcast to the audience members (S210), the audience members have an opportunity to vote for the contestants (S220) during a specified voting period. The audience members cast a vote for any performance they desire. For example, if the performances are broadcast via previously recorded video clips, each video clip could have a "vote" button that is used by the audience members to cast a vote. Preferably, the number of votes an audience member can cast is not limited and the audience member can cast as many votes as they like, and cast more than one vote for each contestant. However, the broadcasters may choose to limit the number of times an audience member can vote or allow unlimited submissions by audience members.

In one embodiment of the invention, the broadcasters of the game show will close the voting after the specific voting period ends (S230). After this voting period closes, no more ballots will be accepted from audience members.

Once voting has closed, the votes are tabulated (S240) to determine the contestant who is the winner (i.e., received the greatest number of votes), the contestant who is the loser (i.e., received the least number of votes), and the audience member who is the winner. Depending on the technology employed, the tabulation of the votes (S240) may be concurrent with the voting process.

In an embodiment of the invention, the contestant who received the most votes from the audience members is the winner. As the winner, this contestant receives a prize and advances to the next round of play (S250a), if such exists, where he or she will perform again as part of a new group of contestants (S210). In another embodiment of the invention, the contestant who received the least votes from the audience members is also a winner of the worst performance prize. As the winner of the worst performance prize, this contestant may or may not receive an actual prize and may or may not advance to the next round of play. In another embodiment of the invention, both the contestant who received the most votes and the contestant who received the least votes are winners, receive an actual prize, and advance to the next round, should one exist. Optionally, a contestant that receives no votes is not eligible for a prize.

In the rare event that two or more contestants receive the same number of votes, the game show can be adjusted to accommodate this event. Should there be a tie for the contestants with the most votes or the least votes, all tied contestants may advance to the next round and receive prizes, or the contestant who received their last vote at a specific time during the voting period may be declared the winner. For example, if two contestants received the exact same number of votes and are tied for the most votes received, the contestant who received the tying vote first during the voting period can be declared the winner. Likewise, if two contestants received the exact same number of votes and are tied for the least votes received, the contestant who received the tying vote last during the voting period can be declared the winner.

In addition to the contestants with the most and least votes being winners, an audience member who submitted a vote for the contestant with the least amount of votes is also a winner and is awarded a prize (S250b). Therefore, if two or more audience members cast a vote for the contestant with the least number of votes, the winner from the audience members is determined by the timing of the winning vote based on a percentage of the total number of votes cast for the contestant receiving the least number of votes, and a relation of that percentage to a specific moment in time during the voting period.

For example, if a total of 300 votes are cast for all contestants within a one hour voting period, and contestant A receives a total of 10 votes (which is the least number of votes), then the number of votes received by contestant A amounts to 3.3333% of the total number of votes cast. The four digits after the decimal point are then used to determine a "winning moment" for selecting the winner from the vote casting audience members. In this example, 3,333 correlates to the number of seconds past the start of the one hour voting period. The audience member who cast the vote at this time for the contestant with the least number of votes is selected as the audience member winner.

Due to the fact that there are only 3,600 seconds in an hour, in the event the four digits after the decimal point are greater than 3,600, then a difference between the four digits and 3,600 will be the number of seconds past the start of the one hour voting period to pinpoint the "winning moment." For example, if the least number of votes received by contestant A amounts to 3.3733% of the total number of votes cast, then the "winning moment" will be 133 seconds past the start of the one hour voting period (i.e., 3,733−3,600=133). Likewise, in the event the four digits after the decimal point are greater than 7,200, then the difference between the four digits and 7,200 will be the number of seconds past the start of the one hour voting period to pinpoint the "winning moment." For example, if the least number of votes received by contestant A amounts to 3.7233% of the total number of votes cast, then the "winning moment" will be 33 seconds past the start of the one hour voting period (i.e., 7,233−7,200 =33).

If two or more audience members vote for the contestant with the least number of votes at approximately the same time, the winning audience member is preferably selected based on the timing of the votes cast. For example, if the "winning moment" is 1800 seconds from the start of the voting period, and two votes are cast for the contestant with the least number of votes at 1799 seconds and 1801 seconds, then the audience member who cast their vote first in time (i.e., at 1799 seconds) is selected as the audience member winner.

Preferably, a computerized vote confirmation system, which is accurate to the one-millionth (0.000001) of a second, is used to lock-in the exact time of the casting of each vote. The use of such an accuracy should be enough to ensure that no votes are cast at exactly the same time, thus avoiding the unlikely situation of a tie between votes cast.

In a further embodiment, the "winning moment" can be based on the start of a time period, and the winning audience member can be selected as the one who cast the first winning vote for the contestant with the least number of votes within the winning time period. With this embodiment, the starting point of the winning time period is determined by the percentage of the least number of votes. For example, if the least number of votes received by a contestant amounts to 1.45526% of the total number of votes, the 5 digits after the decimal point are divided by 36,000 time units (each representing one-tenth of a second) to produce a remainder, i.e., 45,526/36,000 =1 with a remainder of 9,526 time units. Therefore, in this embodiment, the winning time period starts at 15 minutes and 52.6 seconds past the start of a one hour voting period, i.e., 9,526 time units. The audience member who casts the first winning vote for the contestant with the least number of votes during the winning time period will be the audience member winner. In the event the 5 digits after the decimal point are less than the 36,000 time units, then those 5 digits will be used to determine the starting point of the winning time period. In addition, 3600 time units can be used as the denominator in conjunction with 4 digits after the decimal point.

In one embodiment, every prize awarded to a winner, whether a contestant or an audience member winner, is a portion of a prize pool. The contestants who received the most and least votes may be awarded a set percentage of the prize pool or advanced to the next round of the game show, if any. The prize pool includes but is not limited to a sum of money and/or vouchers for goods and/or services. In this embodiment, the remainder of the prize pool, or the grand prize, is shared evenly among the audience members who guessed the correct order. In another embodiment, the audience member who guessed the correct order and submitted his/her ballot first in time or closest to the "winning moment" receives the entire grand prize.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

What is claimed is:

1. A method for a computer to determine a winning audience member viewing a game show, comprising:
   broadcasting performances from a plurality of contestants to a plurality of audience members;
   the computer receiving a plurality of votes from the plurality of audience members during a voting period, each of the plurality of votes including an identifier representing one of the plurality of contestants;
   the computer tabulating the plurality of votes;
   the computer identifying a winning contestant from the plurality of contestants, the winning contestant having received the most number of votes;
   the computer identifying a losing contestant from the plurality of contestants, the losing contestant having received the least number of votes; and
   the computer determining a winning audience member from the plurality of audience members, the winning audience member being determined from a timing of a vote of the winning audience member within the voting period, wherein the timing of the vote of the winning audience member within the voting period is determined based on a relation of the a percentage of a total number of votes for the losing contestant to a specific moment in time during the voting period.

2. The method of claim 1, wherein the timing of the vote of the winning audience member within the voting period is based on a decimal amount of the total number of votes for the losing contestant.

3. The method of claim 2, wherein the specific moment in time is a number of seconds past a start of the voting period, the number of seconds relating to the decimal amount.

4. The method of claim 2, wherein the winning audience member is an audience member who cast a first vote after a start of the specific moment in time.

5. The method of claim 1, further comprising identifying a winning contestant from the plurality of votes, the winning contestant having received the greatest number of votes.

6. The method of claim 1, further comprising providing a monetary award to the winning audience member.

7. The method of claim 1, further comprising collecting a fee for each of said plurality of votes.

8. A system for providing a game show, the system comprising:
   a broadcasting apparatus configured to transmit performances of a plurality of contestants to a plurality of audience members; and
   a processor configured to:
   receive a plurality of votes from the plurality of audience members during a voting period, each of the plurality of votes including an identifier representing one of the plurality of contestants;
   tabulate the plurality of votes;
   identify a winning contestant from the plurality of contestants, the winning contestant having received the most number of votes;
   identify a losing contestant from the plurality of contestants, the losing contestant having received the least number of votes; and
   determine a winning audience member from the plurality of audience members, the winning audience member being determined from a timing of a vote of the winning audience member, wherein the timing of the vote of the winning audience member within the voting period is determined based on a relation of a percentage of a total number of votes for the losing contestant to a specific moment in time during the voting period.

9. The system of claim 8, wherein the timing of the vote of the winning audience member within the voting period is based on a decimal amount of the total number of votes for the losing contestant.

10. The system of claim 9, wherein the specific moment in time is a number of seconds past a start of the voting period, the number of seconds relating to the decimal amount.

11. The system of claim 9, wherein the winning audience member is an audience member who cast a first vote after a start of the specific moment in time.

12. The system of claim 8, wherein the processor is further configured to identify a winning contestant from the plurality of votes, the winning contestant having received the greatest number of votes.

13. The system of claim 8, wherein the processor is further configured to collect a fee for each of said plurality of votes.

\* \* \* \* \*